July 17, 1928.

M. I. BRADLEY 1,677,327

CLUTCH MECHANISM AND CONTROL THEREFOR

Filed Jan. 24, 1927

INVENTOR.
MERRILL I. BRADLEY.
BY
ATTORNEYS.

Patented July 17, 1928.

1,677,327

UNITED STATES PATENT OFFICE.

MERRILL I. BRADLEY, OF DETROIT, MICHIGAN, ASSIGNOR TO UNIVERSAL POWER SHOVEL COMPANY, OF HIGHLAND PARK, MICHIGAN, A CORPORATION OF MICHIGAN.

CLUTCH MECHANISM AND CONTROL THEREFOR.

Application filed January 24, 1927. Serial No. 162,964.

The object of my invention is to provide an efficient and cheaply constructed clutch and a self-locking control therefor for use in connection with hoisting mechanism of power shovels and the like.

With this and other objects in view, my invention consists in the arrangement, combination and construction of the various parts of my improved device, as described in the specification, claimed in my claims and shown in the accompanying drawings, in which:

Figure 1:
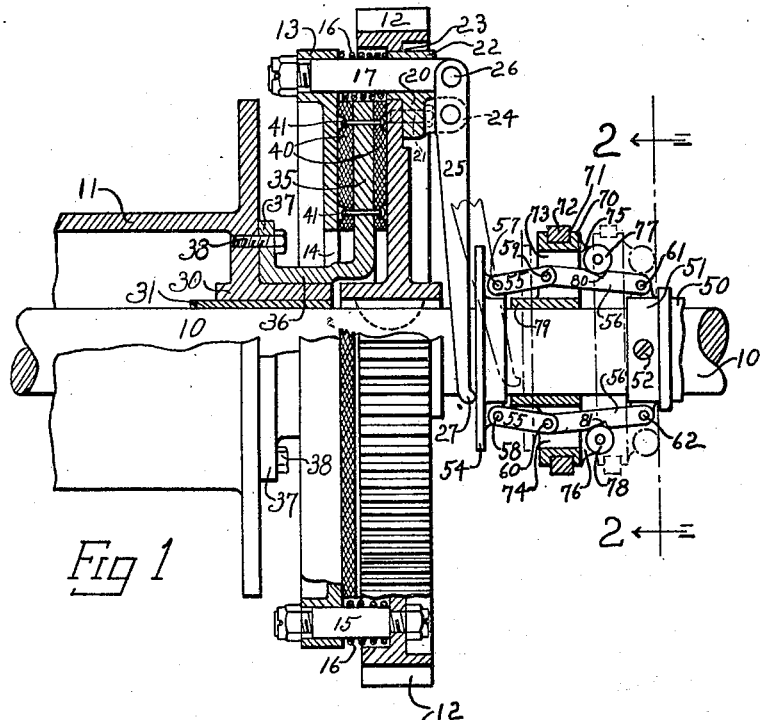
Fig. 1 is a side elevation partly in section, of my device mounted upon a drive shaft.

For the purposes of illustration I have shown my invention mounted upon a shaft 10 and connected with a cable drum 11 such as is used in the operation of power shovels and the like.

Keyed to the shaft 10 is a pinion gear 12 to the left face of which is secured a circular plate 13 having a central opening 14 of sufficiently large diameter to provide a substantial clearance between the edges of said opening 14 and the shaft 10. The plate 13 is secured to the pinion gear 12 by a plurality of bolts 17 and 15 as shown. Coil springs 16 are positioned around the bolts 17 and 15 for the purpose of maintaining the pinion gear 12 and the plate 13 in spaced relation to each other.

Figure 2:
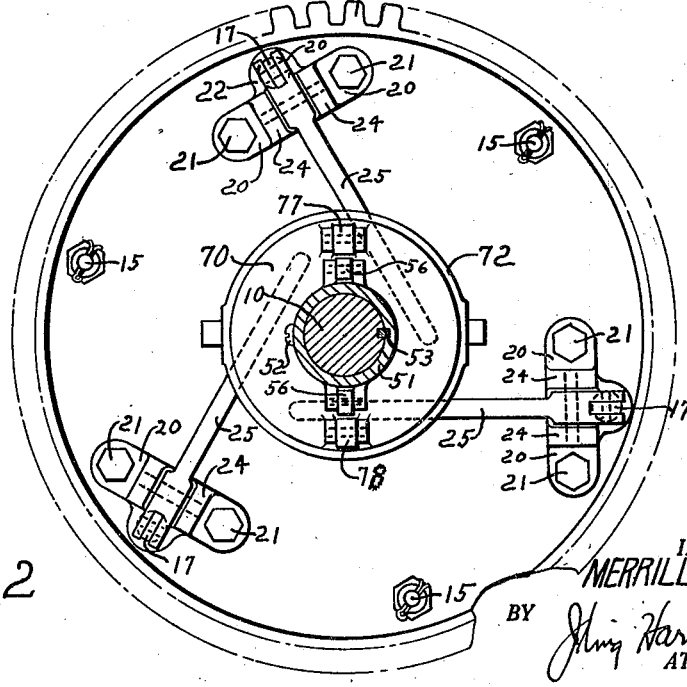
Fig. 2 is a view taken on line 2—2 of Fig. 1.

Secured to the right face of pinion gear 12 adjacent the perimeter thereof by stud bolts 21 are a purality of brackets 20 carrying bushings 22 which are fitted in openings 23 of pinion gear 12, and through which are extended the bolts 17 as shown. Also formed integrally with brackets 20 are spaced ears 24 which extend at right-angles from the face of pinion gear 12 and in which are pivotally secured levers 25 which extend inwardly along the face of pinion 12 to a point adjacent the hub thereof and the shaft 10 as shown more clearly in Fig. 2. The outer ends of the levers 25 are pivotally secured to the ends of bolts 17 as at 26, and the inner ends thereof are formed with outwardly extending knobs 27.

The cable drum 11 is provided with a hub portion 30 which is fitted with a bushing 31 in which the shaft 10 is free to rotate. The hub 30 extends along the shaft 10 to a point within or adjacent to the opening 14 in plate 13. Positioned between the pinion gear 12 and the plate 13 is a disc 35 which has a hub portion 36 which clears the hub of the pinion 12 and extends outwardly through the opening 14 in the plate 13 and fits over and bears upon the extended portion of the drum hub 30. The outer end of hub 36 is outwardly bent to form a flange 37 which is secured to the end of drum 11 by a plurality of bolts 38. Positioned upon each side of that part of the disc 35 which extends between the pinion gear 12 and the plate 13 are pieces of brake lining 40 which are secured to the disc 35 by a plurality of countersunk rivets 41.

Positioned upon the shaft 10 to the right of pinion gear 12 is a clutch control mechanism 50 which comprises a collar 51 secured to the shaft 10 by the stud screw 52 and the key 53, a collar 54 which is slidable on shaft 10 and positioned adjacent levers 25 and which is connected to the collar 51 by the short links 55 and the long links 56 as shown in Fig. 1.

The collar 54 has a smooth surface on one side thereof against which the knobs 27 of the arms 25 bear as shown. The short links 55 are each pivotally secured by an end to the collar 54 as at 57 and 58 and are also each pivotally secured by their opposite ends to the long inks 56 as at 59 and 60, and the ends of the long links 56 which are not secured to the short links 55 are pivotally secured to the collar 51 as at 61 and 62. Positioned upon the shaft 10 between the collars 51 and 54 is a shifter collar 70 which has a circumferential groove 71 therein in which is positioned a shifter fork band 72.

The shifter collar 70 is provided with slots 73 and 74 which are cut therethrough between its perimeter and hub for the accommodation of the links 55 and 56. On the right side of the collar 70 adjacent the slots 73 and 74 are formed ears 75 and 76 which carry rollers 77 and 78 positioned to ride upon the long links 56. The hub portion 79 of the collar 70 is extended to the left along the shaft 10 in order that it may, by coming in contact with the collar 54, prevent the shifter collar 70 from passing completely over the pivotal connections 59 and 60 between the short links 55 and the long links 56. The long links 56 have notches 80 and 81 formed therein which catch and hold the rollers 77 and 78 and lock the shifter collar 70 in a position which holds the clutch mechanism in engagement.

Fig. 1 shows the control mechanism holding the clutch in engagement and the dotted lines show the position of the control mechansm when the clutch s released.

In operation, the depression of the inner ends of levers 25 will cause the outer ends thereof, which are attached to bolts 17, to draw the plate 13 toward the pinion gear 12, compress the springs 16 and cause the disc 35 with its covering of brake lining 40 to be gripped between the plate 13 and the pinion gear 12 to carry it and the cable drum 11 in rotation with the shaft 10. On the other hand, a release of the pressure on the inner ends of levers 25 will permit the coil springs 16 to expand and force the plate 13 away from the pinion gear 12, thus releasing the grip on the disc 35 and permitting the cable drum 11 to ride freely on shaft 10. When it is desired to release the clutch, the collar 70 is moved toward the collar 51, forcing the rollers out of the notches 80 and 81. The pressure of springs 16 will then force the plate 13 away from the pinion gear 12 causing the bolts 17 to pull inwardly on the outer ends of levers 25 and throw the inner ends of said levers outward, thus forcing the collar 54 outward along shaft 10 and causing the links 55 and 56 to break outward at their joints 59 and 60 which brings the control mechanism 50 to the position shown in the dotted lines in Fig. 1.

When it is desired to engage the clutch, the shifter collar 70 is forced inwardly along shaft 10 toward levers 25. This causes the rollers 77 and 78 to move inward on the links 56 and straighten their joints 59 and 60 with links 55, thus forcing the collar 54 toward the pinion gear 12 and depressing the inner ends of the levers 25 which causes the pinion gear 12 and the plate 13 to grip the disc 35 and carry the cable drum 11 in rotation with the shaft 10. The extended hub portion 79 on shifter collar 70 will by coming in contact with collar 54 prevent the shifter collar 70 and rollers 77 and 78 from moving inward far enough to completely straighten the joints 59 and 60 of the links 55 and 56 so that when the shifter collar 70 and rollers 77 and 78 are moved outward the joints 59 and 60 will be in position to break outward and permit the retreat of the collar 54 before the outward pressure of the knobs 27 on the levers 25. The notches 80 and 81 in the long links 56 are positioned to catch and hold the rollers 77 and 78 when the shifter collar 70 has moved inward a sufficient distance to cause the clutch to engage, thus locking the clutch in engagement until the shifter collar 70 is forcibly withdrawn toward collar 51.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination, a shaft having a collar slidable thereon, links pivoted to said collar, a collar fixed on the shaft, other links pivoted to the first ones and to said fixed collar, all said links being extended at an angle to the axis of the shaft, means for varying the angles of the links to thereby vary the span of the same and slide the first collar on the shaft, clutch operating levers operable by the movement of the sliding collar, and means for limiting the variation of the angles of said links comprising a part carried by the first mentioned means adapted to engage said slidable collar.

2. In combination, a shaft having a collar slidable thereon, links pivoted to said collar, a collar fixed on the shaft, other links pivoted to the first ones and to said fixed collar, all said links being extended at an angle to the axis of the shaft, means for varying the angles of the links to thereby vary the span of the same and slide the first collar on the shaft, said means comprising rollers movable along the surface of certain of the links, and notches in certain of said links adapted to engage the rollers at predetermined points to lock them in place against accidental movement.

3. In combination, a shaft having a collar slidable thereon, a fixed collar on said shaft, pairs of pivotally connected links connecting said collars, a member slidable on said shaft between said collars and provided with means co-acting with said links to vary the angularity thereof in respect to said shaft, and means on said links cooperating with the first mentioned means for locking said member against inadvertent movement from a predetermined axial position on said shaft.

4. In combination, a shaft having a collar slidable thereon, links pivoted to said collar, a collar fixed on said shaft, other links pivoted to the first mentioned links and to said fixed collar, all of said links extending at an angle to said shaft, a third collar axially slidable on said shaft between the first and second mentioned collars, openings in said third collar through which said links project, and rollers carried by said third collar in contacting relationship with certain of said links for preventing contact of the same with said third collar and for varying the angle of said links in respect to said shaft.

5. In combination, a clutch driving member secured to a shaft, an axially movable ring, a clutch driven member between said driving member and said ring, springs tending to hold said driven member from being clamped between said driving member and said ring, radially extending levers for controlling said springs, a collar axially slidable on said shaft in contact with the inner ends of said levers, a plurality of links secured at one end in spaced relationship to said collar, a second collar axially fixed on said shaft, links pivotally secured at one end to said collar and pivotally secured to the free ends of the first mentioned links at the other ends thereof, a third collar axially slidable on said shaft between said fixed collar and the joint between each pair of said connected links, rollers on said third collar bearing on certain of said links, means for shifting said third collar axially of said shaft whereby to vary the angularity of said links in respect to said shaft to thereby move the first mentioned collar axially of said shaft to control said spring means, and an extended part on said third collar adapted to contact with the first mentioned collar to thereby prevent said rollers from passing over said joint.

MERRILL I. BRADLEY.